(Model.)

W. H. STOREY.
Glove-Fastener.

No. 228,484.  Patented June 8, 1880.

Witnesses:
W. H. Pearson Jr.
H. H. Warner.

Inventor:
W. H. Storey
by Ridout, Aindob
Attys.

N. PETERS, PHOTO-LITHOGRAPHER, WASHINGTON, D. C.

UNITED STATES PATENT OFFICE.

WILLIAM H. STOREY, OF ACTON, ONTARIO, CANADA.

GLOVE-FASTENER.

SPECIFICATION forming part of Letters Patent No. 228,484, dated June 8, 1880.

Application filed April 19, 1880. (Model.)

*To all whom it may concern:*

Be it known that I, WILLIAM HASLOP STOREY, of the village of Acton, in the county of Halton, in the Province of Ontario, Canada, manufacturer, have invented certain new and useful Improvements in Glove Fasteners and Springs, of which the following is an exact description.

This invention has relation to improvements upon a spring glove-fastener for which a patent was granted to me April 22, 1879; and my improvements have reference to the spring and coupling devices, as more particularly described hereinafter.

Figure 1:
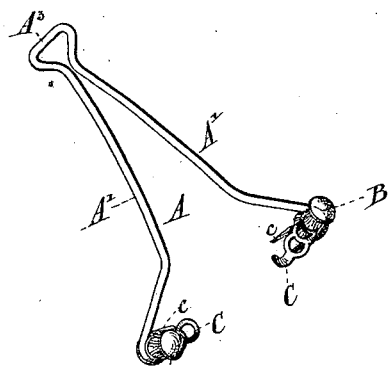
Figure 2:
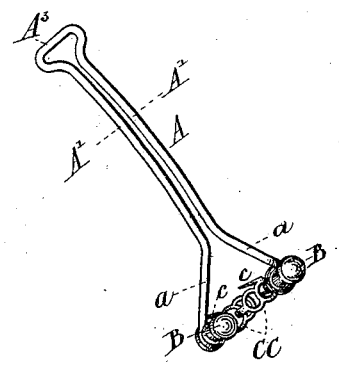
Figure 3:
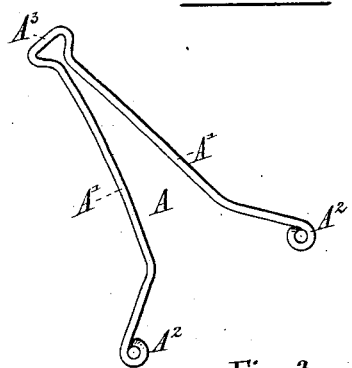
Figure 4:
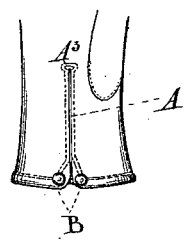
Figure 5:
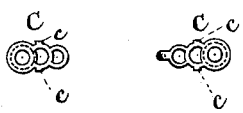
Figure 7:
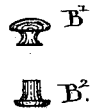

In the accompanying drawings, Figures 1 and 2 are views of my improved fastener as it appears when open and closed. Fig. 3 is a skeleton view of the spring; Fig. 4, a view of the glove fitted with my spring-fastener; and Figs. 5, 6, 7, and 8 are details of the coupling device.

A is the spring, consisting of two diverging legs, A' A', joined together at one end, and made preferably out of a continuous piece of metal.

The spring proper is formed at the point of union of the diverging legs, and may be of the shape shown, or fashioned in any other shape that will develop an elasticity sufficient to keep the diverging legs apart and return them to place after displacement.

The diverging legs, near their free ends, are provided with offsets $a$ $a$, and the extreme ends of the legs are returned inwardly, forming eyes $A^2$ $A^2$, to receive the shank of the stud-buttons B. These stud-buttons are preferably of a description now commonly used in boots, shoes, and other articles of wear instead of the sewed-on button, and consist of two sections, B' $B^2$, which are arranged to clamp together and to be fastened in position by pressure.

As applied to my glove-spring, the shanks of the stud-buttons, before clamping, are passed through the eyes of the diverging legs and through holes in the coupling-plates C, all of which are secured together in proper position when the sections of the stud-button are clamped up in a strong and artistic manner, the studs forming at the ends of the legs an extremely neat and convenient means of drawing the legs of the spring together and for coupling and uncoupling the fastening device. As shown, these coupling devices consist of two perforated plates, C C, one provided with a hook, and the opposite plate having suitable graduated holes, into which said hook passes.

The coupling-plates are provided with cleats $c$ $c$, which are adapted to pass through the material of the glove and be bent over flat on the inner side thereof, securing the coupling-plates from movement.

The shape of the legs of the spring is such that when drawn together and coupled they assume a position parallel to each other, but with an interval between sufficient only for the accommodation of the glove material which overlies the spring. Thus the wrist-opening of the glove is drawn close throughout its entire length and the appearance of the glove on the hand greatly improved.

The formation of the spring proper, at the junction of the diverging legs, with a cross-bar, $A^3$, as shown, permits of the fitting of the spring to the glove in a neater manner than has hitherto been possible.

The spring-fastener may be constructed of any suitable description of wire or metal, and its form may be changed at the head and ends from that illustrated, if desired.

Any other suitable manner of fastening and constructing the studs and coupling-plate may be adopted, as it is not essential that they shall be made and attached in the manner herein described, although I prefer the construction shown, and believe it to be the best.

I claim as new and desire to secure by Letters Patent—

1. In glove-fasteners, the combination, with the spring A, formed substantially as described, of the stud-buttons B B and the coupling-plates C, all arranged and operating substantially as and for the purpose set forth.

2. The stud-buttons B, constructed in two sections, in combination with the coupling-plates C and spring-legs provided with the turned eyes $A^2$ $A^2$, substantially as shown and described.

3. The combination, with the glove provided with a wrist-slit, of a spring-fastening having diverging legs, finger-studs, and coupling devices, and adapted to open the wrist-slit when uncoupled and to draw the edges of the wrist-slit together when closed, substantially as shown and described.

4. In glove-fasteners, the spring herein described, consisting of the diverging legs A' A', cross-bar A³, offsets $a$ $a$, and eyes A² A², all formed from a continuous piece of metal, substantially as and for the purpose set forth.

W. H. STOREY.

Witnesses:
GEORGE A. AIRD,
W. H. PEARSON, Jr.